United States Patent [19]
Gauthier et al.

[11] Patent Number: 6,113,777
[45] Date of Patent: Sep. 5, 2000

[54] DIRECT TURN SEPARATOR FOR PARTICLES IN A GASEOUS MIXTURE AND ITS USE FOR FLUIDIZED BED THERMAL OR CATALYTIC CRACKING

[75] Inventors: Thierry Gauthier, Saint Genis Laval; Patrick Leroy, Lyons; Damien Gille, Vienne; Mariano Del Pozo, Le Havre; Thierry Patureaux, Fontaine la Mallet, all of France

[73] Assignee: Institut Francais du Petrole, Rueil Malmaison Cedex, France

[21] Appl. No.: 09/005,772

[22] Filed: Jan. 12, 1998

[30] Foreign Application Priority Data

Jan. 13, 1997 [FR] France .................................. 97 00327

[51] Int. Cl.⁷ ........................... C10G 35/14; B01D 45/12
[52] U.S. Cl. .......................... 208/161; 208/113; 208/126; 422/147; 55/434; 55/447
[58] Field of Search .................................... 208/161, 113, 208/126; 422/147; 55/434, 447

[56] References Cited

U.S. PATENT DOCUMENTS

| | | | |
|---|---|---|---|
| 4,313,910 | 2/1982 | Dries et al. | 422/147 |
| 4,478,708 | 10/1984 | Farnsworth | 208/161 |
| 4,482,451 | 11/1984 | Kemp | 208/161 |
| 4,664,888 | 5/1987 | Castagnos, Jr. | 422/147 |
| 4,666,674 | 5/1987 | Barnes | 422/144 |
| 4,708,092 | 11/1987 | Engström | 122/4 D |
| 4,721,561 | 1/1988 | Oetiker et al. | 209/144 |
| 4,900,516 | 2/1990 | Engstrom et al. | 422/147 |
| 4,946,656 | 8/1990 | Ross et al. | 422/144 |
| 5,259,855 | 11/1993 | Ross, Jr. et al. | 55/349 |
| 5,362,379 | 11/1994 | Helstrom | 208/161 |
| 5,393,414 | 2/1995 | Lomas et al. | 208/161 |
| 5,451,313 | 9/1995 | Wergerer et al. | 208/164 |
| 5,455,010 | 10/1995 | Lomas et al. | 422/144 |
| 5,665,130 | 9/1997 | Nielsen et al. | 55/307 |
| 5,837,129 | 11/1998 | Ross, Jr. et al. | 208/161 |

FOREIGN PATENT DOCUMENTS

| | | |
|---|---|---|
| 0 332 277 | 9/1989 | European Pat. Off. . |
| 1 110 117 | 2/1956 | France . |
| 85/04117 | 9/1985 | WIPO . |
| 91/03527 | 3/1991 | WIPO . |

OTHER PUBLICATIONS

Quinn et al., "Technology: Post–riser quench improves FCC yields, profitability", *Oil & Gas Journal*, 94(3):33–37, Jan. 15, 1996.

*Primary Examiner*—Walter D. Griffin
*Assistant Examiner*—Nadine Preisch
*Attorney, Agent, or Firm*—Millen, White, Zelano & Branigan, P.C.

[57] ABSTRACT

A separator and process for separating particles from a gaseous mixture wherein the separator includes: at least one chamber comprising a zone (1) which forms a rectangular or square cross section for passage of the mixture circulating in a tube reactor (R) towards a turning zone (3) which rotates the mixture in a vertical plane through an angle of at most 360 degrees; an external wall (30) which defines the turn through an angle of 70 to 225 degrees; a deflection (10) which turns co-axially with the external wall (30) through an angle of at least 30 degrees and at most the angle through which the external wall turns plus 90 degrees; a gas outlet (4) which is coaxial with the turning zone; the separator is indirectly or otherwise connected to a secondary cyclone (12). It also includes a particle outlet (9) having a wall (32) connected to forming zone (1).

16 Claims, 2 Drawing Sheets

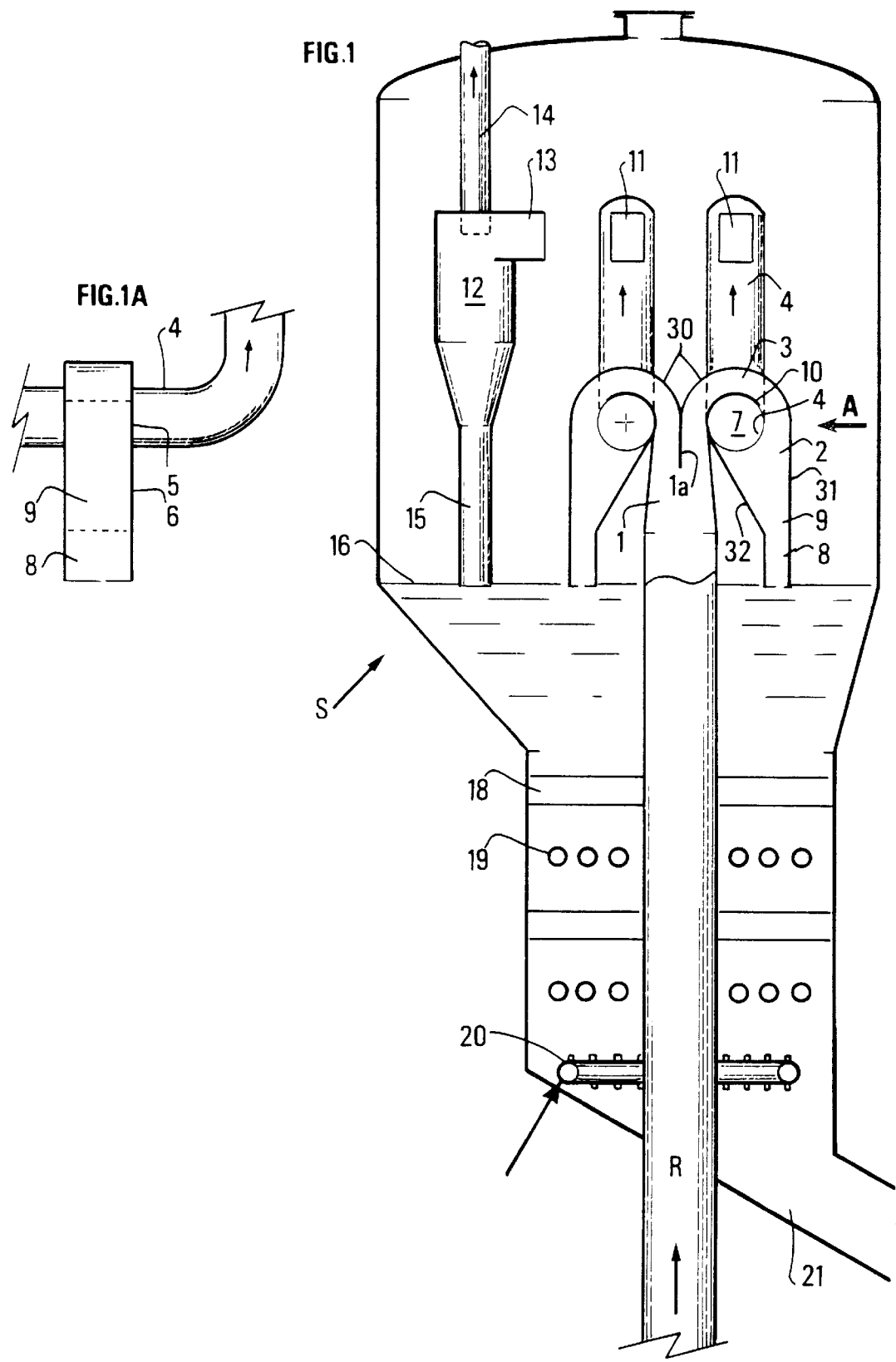

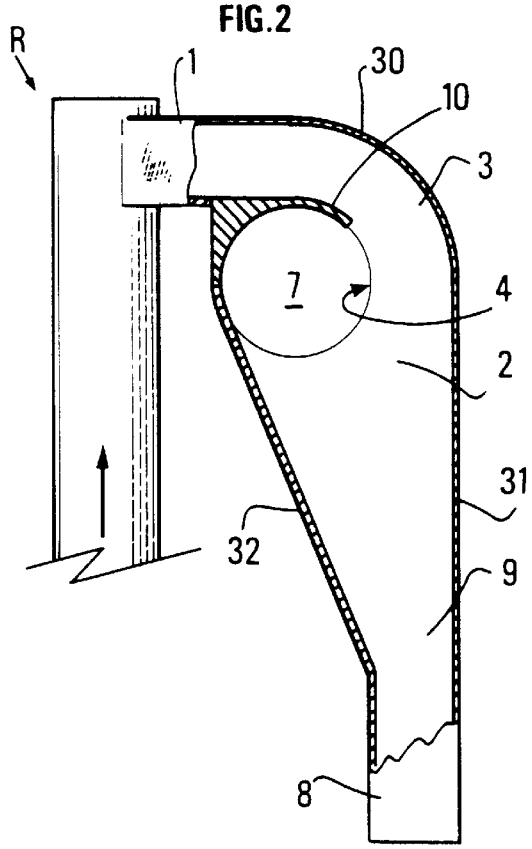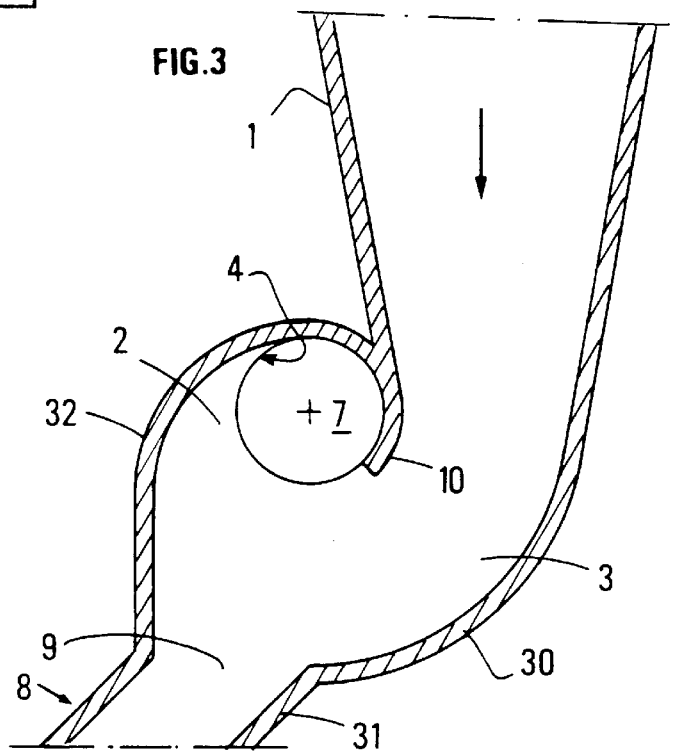

DIRECT TURN SEPARATOR FOR PARTICLES IN A GASEOUS MIXTURE AND ITS USE FOR FLUIDIZED BED THERMAL OR CATALYTIC CRACKING

FIELD OF THE INVENTION

The present invention concerns at least one direct turn rapid separator for separating a particulate solid from a gas and a process for using the separator, particularly for fluidised bed catalytic cracking. It can also be used in a thermal cracking apparatus in the presence of substantially inert particles, with or without steam.

BACKGROUND OF THE INVENTION

In the oil industry, more precisely in circulating bed hydrocarbon feed conversion processes in the presence of a divided solid with catalytic or non catalytic action, the feed is brought into contact with particles of a divided solid in a substantially vertical reactor, the gaseous phase and the solids leaving the same extremity, either at the top of the reactor is the overall flow is upwards (a riser reactor), or at the bottom thereof when the overall flow is downwards (a dropper reactor). The reaction products must be separated from the catalytic or non catalytic particles at the reactor outlet; the reaction products are entrained towards a secondary separation step and the solid particles are recycled to the reactor inlet, in some processes after regeneration which restores the particle properties (for example coke content, activity) which are suitable for the reaction.

SUMMARY OF THE INVENTION

The present invention concerns an apparatus comprising equipment which can carry out rapid separation of the gaseous products from the solid at the reactor outlet, which apparatus is particularly suitable for certain conversion processes such as thermal cracking or catalytic cracking of hydrocarbon feeds characterised by the fact that the temperature at the reactor outlet is generally sufficiently high for secondary degradation reactions of the products to take place.

It may thus be advantageous to use cyclones which are directly connected to the reactor rather than carry out coarse inertial separation in a large volume. Examples of hydrocarbon cut conversion processes with rapid separation are given in U.S. Pat. No. 4,946,656 (Ross et al.), where separation is carried out in a riser cyclone. The use of riser cyclones means that satisfactory separation efficiencies can be obtained. However, a riser cyclone has a large volume which is a function of the diameter of the equipment $D_c$ in meters which can be approximately calculated (to about 10%) as a function of the gas flow rate $Q_g$, in m³/s, by:

$$D_c = 0.63\sqrt{Q_g}$$

The volume of the cyclone can generally be calculated from the diameter of the cyclone. By using a more compact cyclone, a volume of $$V_c = 0.625 \pi D_c^3$$

can be arrived at.

The shortest residence time ts which can be achieved in a riser cyclone is thus:

$$ts = V_c/Q_g = 0.8 D_c$$

For a 1.3 m diameter cyclone, commonly used in industrial hydrocarbon conversion units, this results in an average residence time for the hydrocarbons of about 1 s, which is too long to prevent recombination side reactions.

A further disadvantage of cyclones is their large bulk which means that they have to be installed in very large reactors.

Other systems can also be envisaged. Percevault (French patent FR-A-1 110 117) describes an original separation system to be positioned at the top of a conduit. The system consists of positioning two separation chambers either side of the conduit, the chambers being connected to the conduit via a volute which causes the flow to rotate in the vertical plane. The gas is extracted from the centre of the chambers via a conduit which penetrates vertically into the chambers at the top thereof and opening into the separation chamber via a substantially horizontal opening. This separation apparatus can have a lower volume than a riser cyclone. It is probably well adapted for separation of effluents with low dust contents but is not suitable for the separation of effluents which are highly charged with particles such as those encountered in the catalytic cracking process. Gas evacuation conduits which penetrate vertically into separation chambers form an obstacle to the flow of the gas-solid suspension when the latter passes from the conduit to the separation chambers. This is not a problem when the particles are present in small quantities (typically when the mass flow rate of the particles does not exceed 0.5 times the mass flow rate of the gas). Above this, the particles form a thick, dense layer in the upper portion of the separation chamber and any obstacle, such as penetrating gas evacuation conduits, will encourage the re-entrainment of the particles and thus reduce the separation efficiency. Further, in such a system, the supply conduit opens without transition into the separation chambers, which cause deceleration rather than acceleration. This can separate the large particles with sufficient inertia but not fine particles, which tend to follow the gas currents. Finally, reducing the velocities implies an increase in the separation volume, and thus an increase in both the residence time for the gases and the bulk.

Van den Akker and Hegidius (European patent EP-A2-0 332 277) propose a separation system in which the gas evacuation conduits are positioned horizontally, the gas entering into the separator turning about the axis of the gas evacuation conduits. However, the authors define the separation chambers as communicating with each other. Because of this, it is not possible to establish a flow which is uniformly shaped before the flow is caused to rotate. Further, the gas can re-circulate in the separator, i.e., it can execute a complete rotation and re-enter the contact zone inlet with gas directly from the inlet conduit. This induces a substantial tangential velocity gradient as the gas starts to rotate in the separation chambers, the gas velocity being higher near the separation chamber walls and the axis of the inlet conduit. It is thus difficult to accelerate the gas and particles entering the separation zone uniformly. Further, re-circulation in the separation chamber causes an increase in back-mixing of the gas in the separator and can thus induce a reduction in selectivity for very rapid reactions. Further again, gas re-circulation substantially increases the pressure drop between the inlet and the gas evacuation conduits.

The prior art is also disclosed in the following patents

The U.S. Pat. No. 4,721,561 patent teaches a solid-gas separator with two zones and the need of having two apertures, one for the gas and the preseparated solid towards the bottom, and the other one for going back up the gas.

The WO 95/04117 patent and the U.S. Pat. No. 4,708,092 patent describe a negative pressure separator in a fluidized bed with an inlet and an outlet in the same reactor. It does not work in the same way as that according to the invention (positive pressure separator), since the separator pressure is lower than that of the diluted fluidized phase of the enclosure which contains it.

Finally, the WO 91/03527 patent suggests a centrifuge balistic separator in a scroll form, in which the solids are withdrawn without tube to the diluted fluidized phase of a reactor. All these patents have the drawback of recirculating the gas into the separator, as described in the EP-A-0 332 277 patent.

The present invention can overcome these disadvantages while achieving very rapid separation of the effluents, creating a very small pressure drop and maintaining a separation efficiency for particles of more than 80%. The main aim of the invention is not, in fact, to achieve very high particle separation efficiency, i.e., over 99.9%, as can be achieved with optimised cyclone separators. It is simply a case of withdrawing most of the particles to drastically reduce the catalytic reactions (the progress of which depends on the quantity of solids in contact with the gas) or thermal reactions by reducing the temperature at the separator outlet (by injecting a vaporisable liquid, for example), cooling of the gaseous effluent being made all the easier when it contains fewer particles. More efficient separation can be carried out downstream of the separator of the invention in a more efficient separator as regards particle collection efficiency but exposing the gas to longer residence times, such as in a cyclone train, as most of the gas can no longer react (fewer particles and/or lower temperature).

It has been shown that by carrying out pre-separation of the particles from the effluents, very good results are obtained as regards selectivity.

More precisely, the present invention concerns an entrained bed conversion apparatus for a feed, comprising a reaction vessel R of elongate form, in which said conversion is carried out under appropriate conditions, comprising, near a first extremity, from upstream to downstream in the direction of circulation of the feed, at least one means for introducing at least one entrainment fluid, at least one means for introducing at least one solid divided into particles, and at least one means for introducing said feed, said apparatus comprising, near a second extremity of said vessel, at least one chamber connected to said vessel, for separation of fluids and particles from vessel R and essentially constituted by conversion products of said feed and solid particles.

In detail, the chamber or apparatus for primary separation of particles from a gaseous mixture containing them comprises a mixture inlet connected to an elongate reactor R, which is preferably substantially cylindrical in form, delivering said mixture, a first outlet 4 delivering a gaseous effluent resulting from the separation, containing a minor quantity of particles, and a second outlet 9 delivering a major portion of the particles, the separation chamber being characterized in that it comprises, in combination:

a transition zone I connected to said inlet and adapted to form a rectangular or square cross section for passage of the mixture circulating from the reactor to a turning zone 3 defined below;

a turning zone 3 for turning the flow, connected to the transition zone and adapted to rotate the mixture in a vertical plane through an angle which is less than 360°, comprising two substantially vertical walls 6, between which said rotation occurs, and an external wall 30 defining the turn of said mixture through an angle which is in the range 70° to 225°; and an internal deflector wall 10 tangentially connected to the transition zone and turning substantially co-axially with the external wall through an angle of at least 30° and at most the angle through which the external wall turns, plus 90°;

the first outlet 4 delivering the gaseous effluent being constituted by a tube with an inlet 5 which is an orifice pierced in one of the vertical walls 6 of the turning zone, or by two tubes, preferably non penetrating, of which each inlet is an orifice pierced in each of said walls; said first outlet being substantially coaxial with the turning zone such that the connection of said outlet and said deflector is substantially tangential;

the second outlet 9 comprising a first wall 31 connected to the external wall 30 of the turning zone and a second wall 32 connected to transition zone 1 or to the reactor.

The separator generally comprises lateral faces 6 from the turning zone to the particle outlet which are generally planar, substantially vertical, and preferably parallel to each other.

The transition zone, which is a zone for forming and/or, optionally, accelerating the particle mixture and the effluent between the upper portion of the reactor and the separator, has the following functions:

It can modify the shape of the cross section which passes from a substantially circular shape in the reactor to a substantially rectangular or square shape at the inlet to the turning zone of the separator. This rectangular cross section can have a ratio of 1 to 3 between the longest side and the shortest side, the shortest side generally being that which turns about the gas outlet.

It can accelerate the flow to the optimal separation velocity by means of a gradual reduction in the cross section in the separator. It has been shown that the outlet cross section or, in the case where there is a plurality of separators, the sum of the outlet cross sections from the transition zone of each separator can be in the range 0.5 to once the cross section of the reactor. Under these conditions, the velocity in the rectangular cross section is generally in the range 10 to 30 m/s, preferably 15 to 25 m/s, while it is, for example, 10 to 25 m/s in the cylindrical cross section of the reactor. Its length can be in the range 0.1 to 10 times the reactor diameter, preferably in the range 0.5 to 3 times the reactor diameter.

In a variation where a plurality of separators are disposed parallel to at the reactor outlet, their external walls not intersecting (presence or absence of a tangent point), the transition can comprise, depending on its axis, at least one wall defining angular sectors, with a length which is at most that of the transition zone which is an elongation of the external walls of the turning zones, and in particular when these walls are semi-circular and are tangential at a point in plane P passing through the axes of the turning zones, the deflectors and the gas outlets.

When these external walls are neither tangential nor intersecting, an angled or cone-shaped wall can be interposed, for example a triangular wall, located substantially in their elongation and acting as a stream deflector. These walls or angles extend below said plane P preventing communication between the separation chamber inlets and maintaining the accelerated flow between the transition zone and the turning zone, contributing to forming the flow at the inlet to the turning zone, which is highly advantageous.

The acceleration zone can be horizontal or vertical depending on the form of the separator and depending on whether the reactor is a riser or a dropper.

The turning zone for the mixture of particles and effluents is generally located about a concave deflector. Particles migrate to the wall under centrifugal force. They are transported in this turning zone of the separator, in which the two other walls, which are mutually opposed, are substantially vertical.

Turning is preferably about a rotation axis which is substantially the same as the axis of the effluent outlet tubes.

The turn in the internal wall is usually tangential to the wall in the forming zone. The surface velocity in the turn remains substantially the same as that obtained at the outlet to the forming zone.

In a first embodiment which is applicable to a riser or dropper reactor, the transition zone is horizontal, external wall 30 of the turning zone turns through an angle of 70° to 135° and deflector 10 turns through an angle of 30° to 180°.

In a second embodiment with a riser reactor, the transition zone is vertical, external wall 30 of the turning zone turns through an angle of 160° to 225° and deflector 10 turns through an angle of 135° to 270°.

In a third embodiment with a dropper reactor, the transition zone is vertical, external wall 30 of the turning zone turns through an angle of 70° to 90° and deflector 10 turns through an angle of 30° to 180°.

Advantageously, the two walls of the substantially vertical turning zone are substantially parallel.

The outlet for effluents, which latter generally comprise gaseous products and also less than 20% of entrained particles, can be constituted by a tube in which the inlet is an orifice pierced in one of the vertical walls of the separator, or two tubes in which each inlet is an orifice pierced in each of the vertical walls. Preferably, the tube axis is substantially in a horizontal plane.

When the separator comprises two tubes, these can optionally be combined into one downstream of the separator by addition of pipe bends and joins. The surface velocity of the effluents at the inlet to the outlet tubes is generally in the range 0.5 to 2 times the velocity of the gas at the inlet to the turning zone in the separator, preferably 0.75 to 1.25 times that velocity. In other words, the sum of the cross sections of the first effluent outlets is in the range 0.5 to 2 times the cross section of the reactor passage.

The solid outlet opening between the separator and the solid evacuation conduit is generally disposed along an axis which is at an angle of 0 to 45° to the vertical. It can be tangential to the turn.

Primary separation in accordance with the invention has the following advantages over the prior art:
  because of its low volume, it is more compact. The residence time for effluents is thus very short, of the order of a third to a tenth of the residence time in a conventional cyclone, avoiding re-combination and overcracking reactions. Further, it has a smaller bulk, meaning that modifications on revamping can be limited.
  The absence of gas re-circulation in the separator substantially reduces the pressure drop between the separator inlet and the gas outlet.

Despite its compactness and small size, a separation efficiency of more than 80%, for example, can be obtained.

The invention also concerns the use of at least one primary separation apparatus in accordance with the invention in an apparatus for thermal cracking a hydrocarbon mixture in the presence of inert particles and in the presence or absence of steam.

Finally, it concerns the use of the same separation apparatus in an apparatus for catalytic cracking of a hydrocarbon feed.

The tube reactor in which the feed is cracked in a fluidised bed in the presence of a catalyst can either be outside or inside the stripping chamber in which ultimate separation of the effluents from the catalyst is carried out.

The gaseous effluent outlet from the primary separator of the invention is normally connected to at least one secondary separator such as a cyclone, which can recover the remaining catalyst for stripping and the hydrocarbon effluents which are substantially free of catalyst (in general, less than 0.1% by weight of catalyst). The secondary separator can be located outside the stripping vessel.

In a variation, it can be located inside the vessel. In this case, the secondary separator can be located near the outlet from the tube connected to the gaseous effluent outlet from the primary separator of the invention, as shown in FIG. 1; it thus receives the gaseous effluents from the cracking reaction and the gaseous effluents resulting from stripping the catalyst, at the bottom of the stripping vessel; or it can be connected directly to the outlet from a tube connected to the outlet for the gaseous effluents from the primary separator of the invention. Normally, then, the tube comprises a plurality of holes which receive the gaseous effluents from stripping the catalyst in the lower portion of the stripping vessel, the ensemble of the effluents being evacuated via the secondary cyclone to the outside for subsequent processing.

When the temperature of the gaseous products at the outlet from the reaction zone is to be reduced, it is possible to inject a liquid such as water or mixtures of hydrocarbons (with a boiling point which is lower than the temperature of the products at the flow pressure of the products) into the outlet conduit using means which are known to the skilled person (by way of example, spraying the hydrocarbon injected as a counter-current into the conduit).

The solid evacuation conduits open into a separation and stripping vessel S which can also but not necessarily contain primary and/or secondary separation means, in which the lower portion which can be beneath or above the opening for the evacuation conduits, contains a stock of divided solids maintained in a fluidised state by means of a suitable injection of gas (such as nitrogen, steam, ammonia, carbon dioxide, methane or ethane) located beneath the conduits and properly distributing the gas over the whole cross section. In order to improve the distribution of the solids from the evacuation conduits over the cross section of vessel S, it may be advantageous to use means such as rows of horizontal tubes crossing over each other, or perforated plates placed horizontally and offset with respect to each other, positioned between the opening to these conduits and at least one means for introducing the fluidising gas.

Before being recycled to the inlet to reactor R, the solids can circulate towards regeneration means which restore the properties they possessed before their passage into the reaction zone. When the solids become covered in coke during their passage in reaction zone R, it may be necessary to burn the coke in an apparatus for contacting with air, such as an ensemble of fluidised beds, the coke free solids then being recycled to the inlet to the reaction zone.

BRIEF DESCRIPTION OF THE DRAWINGS

FIGS. 1 to 3 show non limiting examples of embodiments of a primary separation apparatus for separating products and solids from the hydrocarbon conversion apparatus, in which:

FIG. 1 is a front view of an axial cross section through two primary separators of the invention in a hydrocarbon stripping vessel of a catalytic cracking apparatus and figure 1A is a side view of one of the primary separators;

FIG. 2 shows a front view of a "quarter turn" primary separator; and

FIG. 3 is a front view of a primary separator adapted for a dropper reactor.

DETAILED DESCRIPTION OF THE DRAWINGS

FIG. 1 shows a primary separation system used when the reaction zone is a fluidised bed catalytic cracking reactor operating in riser mode. The system of FIG. 1 is of particular use when the reaction zone R penetrates into stripping vessel S, which is generally but not necessarily centred on R, into which solid outlets 8 open. The Figure shows a system of two separation chambers which are substantially symmetrical about the axis of the reaction zone and which operate in parallel, the chambers generally being 1 to 8 in number, preferably 2 to 4 in this configuration.

Each separator (FIG. 1A) is constituted by two planar faces which are substantially parallel to the axis of reaction zone R. Their upper portion turns about a deflector 10 which is substantially semi-circular in form, of which the central axis, which is substantially perpendicular to the axis of the reaction zone, is substantially that of turning zone 3. A transition and acceleration zone 1 can form and accelerate the mixture for each separator between reaction chamber R and a turning zone 3. This turning zone 3, defined by an external wall 30 and deflector 10, is connected to the exterior of each transition zone. The external walls of zones 3 are elongated at the tangent point by a wall 1a directed along the reactor axis to prevent communication between the chamber inlets and to maintain the accelerated flow. A turn rotation of about 180° can change the direction of the particle flow and splatter the particles against the wall under the influence of the centrifugal force induced by turn 3. The turn turns about a central zone 7 which is protected by deflector 10, preventing any circulation between 3 and 7 over an angle of 135°. The gaseous products are evacuated via evacuation conduit 4 which does not penetrate into the separator, is cylindrical in form and which has a central axis which is substantially the same as that of the deflector and the turning zone, and which is connected to the parallel faces 6 of the separator by two openings 5 respectively located in each face 6 of the separator. Evacuation conduit 4 and the deflector are connected substantially along the same diameter, at approximately the thickness of the conduit.

The particles collected at the lower portion of the turn are then evacuated into a solid outlet 9 and channelled into conduit 8. Outlet 9 is tangentially connected to turn 3 via its external wall 31, internal wall 32, which contains at least one segment which is tangential to opening 5 for the product outlet conduit 4, connecting to the transition zone.

Evacuation conduit 8 introduces catalytic particles into a dense fluidised bed 16 of the stripping vessel which is put in motion by fluidisation ring 20. This latter delivers a gaseous current of steam, for example, to strip the hydrocarbons. Conduit 8 opens close to the dense bed (about 1 m away). Horizontal rows 18, 19 of tubes which are crossed over improve the distribution of the particles from conduits 8 and, consequently, improves stripping.

The stripped catalytic particles are sent via a line 21 connected to the lower extremity of the chamber to a regeneration chamber which is not shown in FIG. 1. The gaseous effluent, still containing 10% to 20% of particles, is introduced via an opening 11 in line 4 to the inlet 13 to a separation cyclone 12 to recover substantially all of the particles via a dipleg 15. Inlet 13 also recovers the effluents resulting from stripping.

The gaseous cracking and stripping effluents are evacuated from the cyclone via a line 14 towards downstream processing units which are not shown.

FIG. 2 shows a primary separation system of the present invention as used when the reaction zone is a riser reactor. The system proposed in FIG. 2 is particularly suitable when the reaction zone R does not penetrate into stripping vessel S. Transition zone 1 is thus substantially horizontal, transition zone 1 thus being sufficiently long to allow the separator to be placed inside S or sufficiently short for the separator to be positioned outside S, conduit 8 then connecting to the wall of chamber S. The figure shows a single-chamber system, the chambers numbering 1 to 8, and preferably 1 to 3 in this configuration. Transition zone 1 carries out a transition and a direction change for each separator between reaction chamber R and turn 3. Turn 3 is tangentially connected to the outside of each transition zone. Rotating the turn through about 90° (in the range 45° to 135°) changes the direction of flow of the particles and splatters the particles against the wall under the influence of the centrifugal force induced by turn 3. The turn turns about central zone 7, which is protected by a deflector 8, preventing any circulation between turn 3 and central zone 7 over at least 15° out of the 45° to 135° of rotation of turn 3. The products are evacuated via product evacuation conduit 4 which is substantially coaxial to the deflector and which is connected to the parallel faces of the separator via two openings respectively located on each face 6 of the separator. The collected particles are then evacuated from outlet 9 towards evacuation conduit 8, outlet 9 being connected tangentially to turn 3 at its external surface 31, the internal surface containing at least one segment which is tangential to opening 5 of the product outlet conduit 4.

FIG. 3 shows a primary separation system of the present invention as used when the reaction zone is a dropper reactor. The system shown in FIG. 3 is suitable when the reaction zone R does or does not penetrate into stripping vessel S. Transition zone 1 is located in the elongate portion of the reactor. The figure shows a single-chamber system, the chambers numbering 1 to 8, and preferably 1 to 4 in this configuration. Transition zone 1 carries out a transition for each separator between reaction chamber R and turn 3. Turn 3 is tangentially connected to the outside of each transition zone. Rotating the turn through about 90° changes the direction of the particle flow and splatters the particles against the wall under the influence of the centrifugal force induced by turn 3. In this particular case, the turn necessarily stops when the tangent to the turn meets the horizontal. The turn turns about central zone 7, which is protected by a deflector 10, preventing any circulation between turn 3 and central zone 7 over an angle of at least 15° of the 90° of rotation of turn 3. The products are evacuated via product evacuation conduit 4 connected to the parallel faces of the separator via two openings respectively located on each face 6 of the separator. This conduit 4 is substantially coaxial to the deflector.

The collected particles are then evacuated towards the bottom in outlet zone 9 towards solids outlet channel 8, outlet 9 being connected to turn 3 at its external surface 31, the internal surface which can form a turn between the two parallel faces of the separator being tangentially connected via at least one segment to opening 5 of the product outlet conduit 4. The solids evacuation tube can be inclined at a maximum of 45° to the vertical, which means that the separator can optionally be positioned outside the stripping vessel S when reaction zone R is outside vessel S.

The present invention can produce satisfactory separation when the velocity of the gaseous fluids at the outlet to the transition zone and in the turning zone is in the range 10 to 30 m is, preferably in the range 15 to 25 m/s. The solid charge, defined as the weight ratio between the flow rate of solid and the flow rate of the fluids, is preferably in the range 2 to 100, depending on the physical properties of the particles, such that this ratio can produce stable flow conditions in reaction zone R. Opening 5 for gas evacuation can operate correctly when the velocity of the gases in these openings is in the range 50% to 150% of the velocity of the gases at the inlet to the separation zone. Solids evacuation conduits 8 must allow evacuation of all of the solid circulating in each primary separator while maintaining a mass flow rate of solid material per unit surface area of more than 100 kg/s/m$^2$, preferably in the range 300–800 kg/s/m$^2$.

EXAMPLE

Tests were carried out using an apparatus in accordance with the invention using a direct turn separator as shown in FIG. 1. The separator was constituted by two direct turn chambers. The external rotation diameter of the turn was 95 mm and the internal diameter of the turn, which acted as a deflector, was 50 mm. The gas evacuation conduit was constituted by two non penetrating tubes centred on the turn axis and bearing coaxially on the deflector which turned through an angle of 180°. The separator was supplied via a vertical 123 mm diameter transport tube which could transport up to 12 t/h of catalyst from a fluidised bed. The catalyst separated in the separator was re-injected into the fluidised bed for continuous operation. This system was operated under ambient temperature and pressure conditions such that the density of the gas in the separator was 1.2 kg/m$^3$. Under these conditions, it was observed that if less than 5% of gas was entrained with the solid (this quantity depending on the counter-pressure exerted at the particle outlet with respect to the gas outlet), then the pressure drop between the turn inlet and the gas evacuation tube outlet was less than 800 Pa when the velocity in the turn was 20 m/s. Tests carried out at a gas velocity of 5 m/s in the turn showed that the particle collection efficiency was more than 97% for a particle flow rate of 7 t/h, while the quantity of gas extracted with the particles was in the range 2% to 50%.

The preceding examples can be repeated with similar success by substituting the generically or specifically described reactants and/or operating conditions of this invention for those used in the preceding examples.

The entire disclosure of all applications, patents and publications, cited above and below, and of corresponding French application No 97/00.327, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for separating particles, comprising at least one separation chamber for separating said particles from a gaseous mixture, said separation chamber comprising a mixture inlet connected to a vertical elongate reactor R, for delivering said mixture, a first outlet (4) for delivering a gaseous effluent resulting from separation, containing a minor quantity of particles, and a second outlet (9) for delivering a major portion of the particles, the separation chamber comprising, in combination:

a transition zone (1) connected to said inlet and adapted to form a rectangular cross section for passage of the mixture circulating from the reactor to a turning zone (3);

said turning zone (3) for turning the flow, being connected to the transition zone and adapted to rotate the mixture in a vertical plane through an angle which is less than 360°, comprising two substantially vertical walls (6), between which said rotation occurs, and an external wall (30) defining the turn of said mixture through an angle which is in the range 70° to 225°; and an internal deflector wall (10) tangentially connected to the transition zone and turning substantially coaxially with the external wall through an angle of at least 30° and at most the angle through which the external wall turns, plus 90°;

the first outlet (4) for delivering the gaseous effluent being constituted by a tube having a horizontal span in communication with an inlet (5) comprising an orifice pierced in one of the vertical walls (6) of the turning zone, or by two tubes of which each inlet is an orifice pierced in each of said walls; said first outlet being substantially coaxial with the turning zone such that the connection of said outlet and said deflector is substantially tangential;

the second outlet (9) comprising a first wall (31) connected to the external wall (30) of the turning zone and a second wall (32) connected to transition zone (1) or to the reactor.

2. An apparatus according to claim 1, in which the transition zone (1) is horizontal, the external wall (30) of the turning zone turns through an angle of 70° to 135° and the deflector (10) turns through an angle of 30° to 180°.

3. An apparatus according to claim 1, in which the reactor (R) is a riser reactor, the transition zone (1) is vertical, the external wall (30) of the turning zone turns through an angle of 160° to 225° and the deflector (10) turns through an angle of 135° to 270°.

4. An apparatus according to claim 1, in which the reactor is a dropper reactor, the transition zone (1) is vertical, the external wall (30) of the turning zone turns through an angle of 70° to 90° and the deflector turns through an angle of 30° to 180°.

5. An apparatus according to claim 1, in which the two substantially vertical walls (6) in the turning zone are substantially parallel.

6. An apparatus according to claim 1, in which the transition zone is also an acceleration zone, the cross section or the sum of the cross sections of the outlet from the transition zone of each of the chambers, in the case where there are at least two separation chambers, is in the range 0.5 to one time the cross section of the reactor and in which the cross section or the sum of the cross sections of the first gas outlet is in the range 0.5 to two times the cross section of the reactor.

7. An apparatus according to claim 1, comprising at least two separation chambers in which the external walls do not intersect, said chambers being disposed parallel to the outlet to the reactor (R), in which the transition zone comprises along its axis at least one wall (1a) with a length which is at most equal to that of the transition zone, which is substantially an elongation of said external walls (30) of the turning zones.

8. A process for separating particles from a gaseous mixture in a fluidised bed apparatus for catalytic cracking of a hydrocarbon feed comprising passing said gaseous mixture through an apparatus according to claim 1.

9. A process according to claim 8, in which the tube reactor (R) penetrates into a hydrocarbon stripping vessel (5).

10. A process according to claim 8, in which the tube reactor is external to a hydrocarbon stripping vessel.

11. A process according to claim 10, in which the separation apparatus is external to the stripping vessel.

12. A process according to claim 8, in which the first outlet (4) from the separation apparatus is connected to at least one secondary separator (12).

13. A process according to claim 12, in which the secondary separator is located in a stripping vessel.

14. A process according to claim 13, in which the secondary separator (12) and the outlet from a tube connected to the first outlet (4) delivering the gaseous effluent are located in the stripping vessel.

15. A process according to claim 13, in which the secondary separator is directly connected to the outlet from a tube connected to the first outlet delivering the gaseous effluent, said tube comprising a plurality of holes for receiving gaseous effluents resulting from stripping a catalyst in the stripping vessel.

16. A process for separating particles from a gaseous mixture according, in an apparatus for thermal cracking of a mixture of hydrocarbons in the presence of substantially inert particles and in the presence or absence of steam, comprising passing said mixture through an apparatus according to claim 1.

* * * * *